L. CLARK.
FURNACE.
APPLICATION FILED DEC. 18, 1918.

1,317,553.

Patented Sept. 30, 1919.

Inventor:
Lincoln Clark
by Anton Befner
Atty

UNITED STATES PATENT OFFICE.

LINCOLN CLARK, OF PASADENA, CALIFORNIA.

FURNACE.

1,317,553.          Specification of Letters Patent.      Patented Sept. 30, 1919.

Application filed December 18, 1918. Serial No. 268,099.

*To all whom it may concern:*

Be it known that I, LINCOLN CLARK, a citizen of the United States, residing at Pasadena, county of Los Angeles and State of California, have invented a certain new and useful Furnace, of which the following is a specification.

My invention relates to an apparatus for reducing ores and has particular reference to an oil burning furnace, an object of the invention being to provide an effective reduction plant in which ore or ore containing bodies may be continuously treated for reduction or metallization, with considerable economy in fuel, and in which the heat may be concentrated on the ore mass, whereby the time of treatment for reduction may be reduced by reason of a material increase in calories per cubic foot of combustion gases, resulting in an increased capacity of the furnace.

My invention also enables the use of a fuel, such as oil or combustible gases, which in certain localities are cheaper per B. T. U. than coke, the usual fuel.

The accompanying drawing illustrates a preferred form of apparatus.

Figure 1:
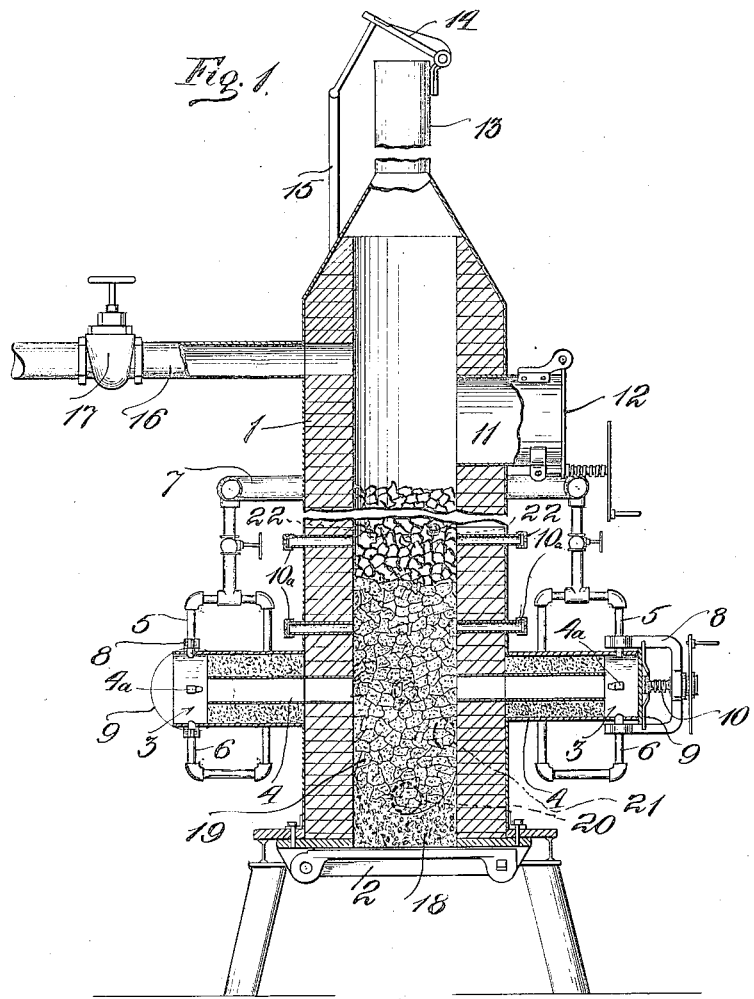
Figure 2:
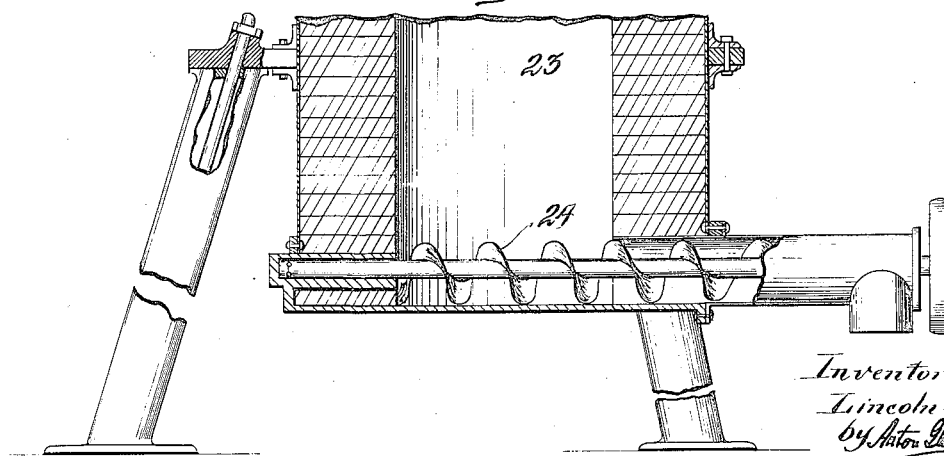

Therein,

Figure 1 is a sectional elevation showing a furnace for reducing ores to a molten state, and Fig. 2 is a fragmentary section of a furnace showing means for removing metallized ore bodies.

The furnace consists of a vertical chamber 1, suitably supported above the floor level and provided with a downwardly swinging discharge door or gate 2, forming the bottom of the furnace, and the support for the superimposed mass of material hereinafter referred to.

Disposed about the chamber 1, is a plurality of combustion chambers 3, having tubes or pipes 4, communicating with and serving to convey the products of combustion to the interior of the furnace.

Gases of combustion under pressure are produced in the combustion chambers 3, by the burning of oil, supplied by burners $4^a$ in the presence of air under pressure, delivered through pipes 5 and 6, leading from a manifold 7. Each pipe 5 and 6, of each combustion chamber, form pivots for a yoke 8, in which is slidably carried a closure 9, operable in any well known manner, as by a screw 10, to close the combustion chamber, and which yoke 8, may be swung on the pipes 5 and 6, with the closure, to uncover the opening to the combustion chamber.

Suitable sights $10^a$ for enabling the observation of the reduction within the furnace, are provided at desirable points.

11 designates an ore feed opening, which after introduction of the charge into the furnace, is sealed by a cover 12, and 13 represents a stack, having pivotally mounted thereon a valve member 14, controllable by a rod 15, for maintaining the gases of combustion and effecting the reduction of ore under pressure.

Leading from the chamber 1, is a pipe 16, provided with a valve 17, through which the fumes, gases, dust and other volatilized constituents may be collected for subsequent treatment.

In practice, a cinder bed 18, is first built upon the bottom of the furnace, and the fires in the combustion chambers started, which is done while all of the closures thereof are open, affording a natural draft through the furnace. Thereupon upon the cinder bed 18, is deposited a suitable material, dependent upon the character of the ore to be treated, and which material may be coke, the height of which is sufficient to reach beyond the communicating flues or pipes 4 of the combustion chambers.

After the starting of the fires, the closures are shut and air under pressure to maintain the fires and production of combustion gases is introduced through the pipes 5 and 6.

Thereupon an ore charge is delivered through the ore feed opening 11, and the cover of the opening, as well as the valve member 14, on the stack, are closed. The valve 17, under these conditinos, is open to maintain the pressure, or the valve 14 may be left partially open and the valve 17 be entirely closed.

Thus the reduction of ores takes place under pressure, the molten metal percolating through the coke screen 19, kept incandescent or at the proper temperature required, by the combustion gases issuing from the tubes or pipes 4, and finally collecting or settling on the cinder bed 18, in the bottom of the furnace, from which it may be drawn through an outlet 20, after removal of the slag or other surface accumulations through a slag hole 21, it being understood of course that suitable fluxing material, when necessary, is introduced with the ore.

Since the maintenance of pressure of the combustion gases within the furnace, yields an increase in calories per cubic foot of gas, it is obvious that a very speedy reduction may take place, and also that a fuel of less calorific value than coke may, if burned under sufficient pressure, produce as many available calories as coke burned under a lesser pressure.

Where sulfid ores are to be treated, it is advisable and sometimes necessary, to introduce a substance, such as steam, air, or any other agents suited for the purpose, to assist in the chemical reaction occurring during the reduction.

Such substances or agents may be introduced through pipe 22.

In Fig. 2 I have illustrated a form of apparatus for metalizing. It consists of a furnace 23, in all essentials identical with the furnace shown in Fig. 1, except that the coke bed and bottom are omitted, and in their stead is placed a feed 24, for removing the metallized products from the furnace.

What I claim, is:—

1. A furnace comprising a chamber, a means for generating combustion gases without the chamber and supplying same under pressure to the interior of the chamber, and means to maintain therein the pressure caused by the incoming combustion gases.

2. A furnace comprising a chamber having a swinging door forming the bottom of said chamber, means for producing gases of combustion, means to convey the gases under pressure to the interior of the furnace, a stack, and means to maintain within the furnace the pressure caused by the gases of combustion.

3. A furnace comprising a chamber having an ore charging inlet and an outlet, a plurality of chambers disposed about said first named chamber, means to produce gases of combustion within said chambers, means to convey the products of combustion under pressure to the interior of the furnace, a stack, and means to maintain within said first named chamber the pressure caused by the combustion gases.

4. A furnace comprising a chamber partially filled with refractory material, and having a charging inlet and an outlet, means for generating gases of combustion without said chamber and supplying same under pressure within said chamber, and means to maintain therein the pressure caused by the combustion gases.

In testimony whereof I affix my signature in the presence of two witnesses.

LINCOLN CLARK.

Witnesses:
F. M. NOBLET,
ANTON GLOETZNER, Jr.